Oct. 26, 1943.　　　A. N. IKNAYAN　　　2,332,913
METHOD OF MANUFACTURING PUNCTURE SEALING INNER TUBE
Original Filed Oct. 10, 1940
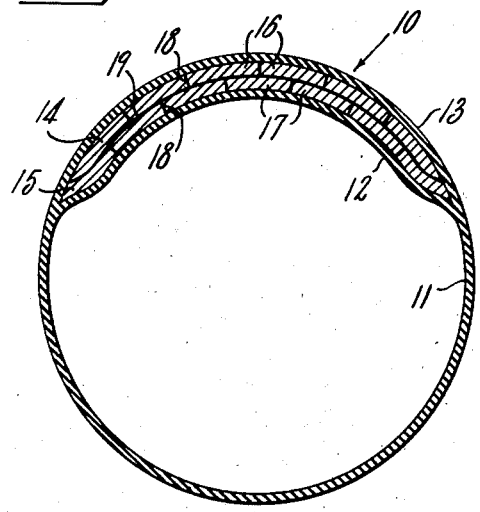
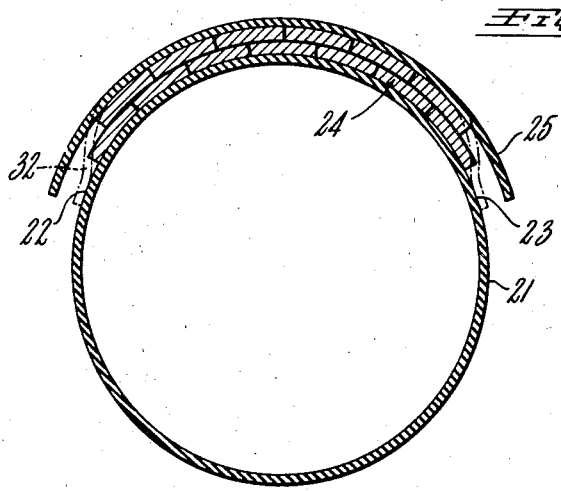
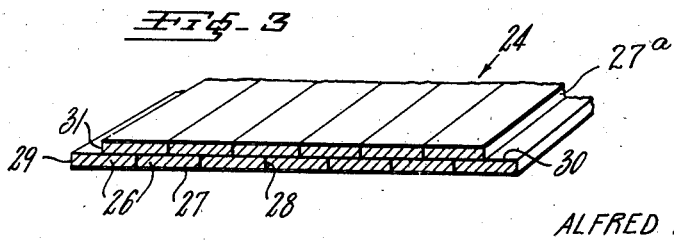
INVENTOR.
ALFRED NICHOLAS IKNAYAN
BY
ATTORNEY Patented Oct. 26, 1943

2,332,913

UNITED STATES PATENT OFFICE 2,332,913

METHOD OF MANUFACTURING PUNCTURE SEALING INNER TUBES

Alfred Nicholas Iknayan, Indianapolis, Ind., assignor to United States Rubber Company, New York, N. Y., a corporation of New Jersey Original application October 10, 1940, Serial No. 360,568. Divided and this application July 22, 1941, Serial No. 403,540

8 Claims. (Cl. 154—15)

This invention relates to a method of manufacturing puncture sealing inner tubes. More particularly it relates to puncture sealing inner tubes of a type having plastic composition enclosed in a plurality of compartments in the crown portion or region of the tube for rendering the tube substantially puncture-proof under most conditions of operation.

This application is a division of my co-pending application Serial No. 360,568, filed October 10, 1940.

Heretofore inner tubes have been provided with plastic puncture sealing composition enclosed in their crown portions for protecting the tubes against punctures, blow-outs and the like. However, in such inner tubes of former constructions external forces and other conditions sometimes caused undesired displacement of the plastic material. For example, heat and centrifugal force, created by the inner tube operating at high speeds in a tire, often caused the plastic material so enclosed to "flow" or move laterally toward the greatest circumference of the tube, thus leaving the spaced circumferential edges of the crown portion unprotected by the puncture sealing material. In cases where partitions were employed to subdivide the plastic material and thereby reduce such lateral movement of the plastic composition, unsatisfactory conditions often resulted since these partitions were usually formed from calendered sheet rubber and were of substantial thickness, consequently producing a relatively thick stiff hard riding tire which generated much heat and caused detrimental effects in the inner tube and the tire surrounding the tube during operation thereof upon a vehicle wheel.

The inner tube of the present invention and its method of manufacture have substantially eliminated these and other objectionable conditions by enclosing within the crown portion of the tube a plurality of circumferentially extending strips of plastic puncture sealing composition separated by very thin flexible partitions or membranes of vulcanized rubber composition. These separating partitions or membranes are bonded to the spaced walls of the inner tube and completely enclose the individual strips of plastic composition so as to retain the plastic composition in proper position during operation of the inner tube. Since these partitions are exceedingly thin and flexible, the total thickness of the tube at the crown region is materially reduced without decreasing the quantity of plastic available for sealing purposes. This reduction in thickness produces softer easier riding conditions as well as a reduction in the amount of heat generated during use of the tube. The strips of plastic puncture sealing composition are arranged preferably in two layers with the strips of one layer in staggered relation to the strips of the other, so that at least two strips of plastic composition will be pierced should a puncturing medium pass through the crown portion of the inner tube.

The invention will be more fully understood when taken in conjunction with the accompanying drawing, in which:—

Fig. 1 is a transverse cross-sectional view of a full-molded puncture sealing inner tube of the plastic type made in accordance with the present invention;

Fig. 2 is a transverse cross-sectional view showing the component parts of the inner tube of Fig. 1 during the manufacture thereof; and Fig. 3 is an enlarged perspective view of a portion of a composite layer of plastic material used in the manufacture of the inner tube of Fig. 1.

Referring in particular to Fig. 1 of the drawing, it will be seen that the reference numeral 10 indicates generally a full-molded puncture sealing inner tube which comprises an endless tubular wall 11 of vulcanized rubber composition having inner and outer spaced wall portions 12 and 13 at the crown region of the tube. Between these spaced walls 12 and 13 are positioned preferably two layers 14 and 15 of laterally spaced circumferentially extending strips 16 and 17 of plastic puncture sealing composition. The strips of each layer are separated from each other by a plurality of extremely thin circumferentially extending partitions or membranes 18 composed of skins of vulcanized rubber composition integrally bonded to the interior surfaces of the walls 12 and 13. Between the layers 14 and 15 is positioned a similar thin partition or membrane 19 consisting of a skin of vulcanized rubber composition which extends circumferentially throughout the crown region of the inner tube and has its opposite lateral edges integrally attached to the wall 13 and has intermediate portions thereof integrally secured to the inner edges of the partitions 18, thus forming a plurality of compartments for the plastic composition.

The strips of the two layers 14 and 15 are preferably arranged in super-imposed and staggered relation so that the partitions 18 of one layer are laterally off-set with respect to similar partitions in the other layer. By this arrangement all locations in the crown portion of the inner tube are protected by the plastic material of at least two compartments and consequently any penetrating medium passing through the crown portion of the inner tube will necessarily have to pierce at least two strips of plastic puncture sealing composition before reaching the interior of the tube. Thus it will be seen that the interconnected partitions or membranes 18 and 19 jointly serve to enclose and retain the plastic strips 16 and 17 in proper position in the crown portion of the inner tube during operation of the inner tube in a conventional vehicle tire.

In the construction of the preferred form of inner tube described above, a cured or substantially cured conventional inner tube 21, of a size slightly less than that desired in the completed puncture sealing inner tube, is inflated (Fig. 2) to its normal expanded but unstretched shape. (It will be apparent, however, to those skilled in the art that an uncured inner tube may similarly be employed, if desired, but will not be quite so easy to work with.) If desired, at this time the inflated inner tube may be mounted upon a suitable support, such as a rotatably mounted drum or wheel, so that it may be conveniently worked upon. After the inner tube has been properly inflated, circumferentially extending sidewall portions 22 and 23 at opposite sides of the tube, and, if desired, the intermediate crown region, are buffed, after which these portions are coated with a vulcanizable rubber cement and allowed to dry. When sufficient time has been allowed for the drying of the cement the tube is ready to have a composite puncture sealing layer 24 and an outer covering layer 25 of vulcanizable rubber composition, of rubber stock similar to the wall 21, applied thereto.

The formation of the composite layer 24 (Fig. 3) is accomplished by placing a sheet of normally non-vulcanizable plastic rubber composition (to be hereinafter more completely described) of predetermined thickness upon a suitable sheet of flexible backing material, such as Holland cloth, Textolin, treated paper or the like, so that it may be handled conveniently and without distortion during the subsequent steps involved in the building of the inner tube. The supported plastic sheet is then cut into elongated strips of plastic 26 and backing material 27 of proper width and these strips are painted, sprayed or otherwise given a coating 27a on their opposite edges 28 with a film-forming or cure-producing solution or dispersion of vulcanizable rubber composition. (Also to be hereinafter more completely described.) This solution or dispersion is a liquid having a viscosity of about that of ordinary thin house paint so that the thickness of the material which dries in situ as a thin deposit upon the strips is practically negligible. Before, during or after the solution or dispersion has dried to form this deposit, the strips are moved together into edge contacting relation to form a flat elongated layer 29. When a second layer is to be employed in conjunction with the layer 29, as is the case in the present embodiment of the invention, the top surface 30 of the layer 29 is similarly coated with the film-forming solution, after which a layer 31, prepared in a manner similar to the layer 29, is placed upon the surface 30 with the individual strips thereof in staggered relation relative to the strips of the layer 29 as is clearly shown in Fig. 3.

The composite layer 24 thus assembled is next applied to the prepared crown portion of the inner tube 21, during which operation the strips 27 of backing material are removed. The composite layer 24, being entirely plastic at this stage in the building of the inner tube, molds itself readily to the exterior curved surface of the crown portion of the inner tube 21. The layer 25 of vulcanizable rubber composition is applied to the outer surface of the layer 24 and has its free edges stitched down, as indicated by dotted lines at 32, against the marginal portions 22 and 23 of the inflated inner tube 21.

The assembled structure is now ready to be placed in a cold vulcanizing mold of proper predetermined size and inflated somewhat more for vulcanizing purposes. The temperature of the mold is then raised to approximately 310° F. and the inner tube vulcanized for a proper predetermined period. The duration of this curing period is dependent upon the thickness of the tube structure at the crown portion thereof, and in actual practice where two layers of plastic strips 26 were employed having a combined thickness of approximately ¼ inch in a curing period from 15 to 20 minutes has been found to produce good results. Improved results have been obtained, after vulcanization of the tube, by allowing the mold and inner tube to cool completely before the mold is opened and the inner tube removed. This procedure is desirable so that the formation of gas pockets in the plastic composition thereof is avoided.

During vulcanization of the inner tube, the edges of the outer covering layer 25 become integrally bonded to the tubular wall 21 with the composite layer 24 completely enclosed within fully vulcanized inner tube stock at the crown portion of the inner tube. At the same time the film-forming solution coating the surfaces 28 and 30 of the plastic strips 26 reacts with the normally non-vulcanizable rubber composition of these strips 26 and forms between these strips a thin vulcanized film, skin or membrane which serves to permanently retain the enclosed plastic composition of each strip in place and prevent any movement thereof under the influence of heat and centrifugal force when in service in a conventional vehicle tire. Due to the fact that these skins are of negligible thickness the plastic material is a substantially continuous mass, there being no spaces of appreciable thickness between the inner and outer walls of the tube which are not filled with the sealing material. Thus a substantially continuous puncture-sealing layer is provided with anchoring membranes dispersed in it to prevent creeping of the puncture-sealing material.

The composition of the normally non-vulcanizable plastic of the strips 26 and the composition of the film-forming solution for coating the surfaces 28 and 30, which have given very satisfactory results together in producing the fully vulcanized separating skin or membrane, are given in the following tables:

| Non-vulcanizing plastic | Parts by weight |
|---|---|
| Rubber | 100.00 |
| Mercaptobenzothiazole | .50 |
| Zinc chloride | 1.00 |
| Softener or plasticizer | 2.00 |
| Rubber peptizing agent | 1.00 |
| Rosin oil | 5.00 |

| Film-forming solution | Parts by weight |
|---|---|
| Smoked sheet rubber | 100.00 |
| Sulphur | 25.00 |
| Accelerator | 12.50 |
| Light calcined magnesia | 25.00 |
| Urea | 10.00 |
| Zinc oxide | 2.50 |
| Zinc laurate | 2.50 |
| Solvent (naphtha) | 1,000.00 |

While very satisfactory results have been obtained with plastic composition and film-forming solution comprising the ingredients of the above tables, it will be readily apparent to those skilled in the art that other modified forms of plastic rubber compositions and film-forming liquids may be employed, if desired, in the formation of the partitioned layer 24 of the inner tube within the scope of the invention.

It should be noted that during the vulcanization of the assembled puncture sealing inner tube of Fig. 2, the stresses occurring in the previously cured wall 21, by being forced outwardly against the mold and the layers 24 and 25, are relieved and the entire tube assembly becomes cured to a natural shape corresponding to the shape of the vulcanizing mold, thereby producing the full-molded puncture sealing inner tube shown in Fig. 1.

Thus it will be seen from the foregoing description of this invention that puncture sealing inner tubes having plastic sealing composition in the crown portions thereof may be readily and economically formed so that the plastic material thereof is permanently located and properly retained in its desired place within the tube at all times and under all conditions of operation thereof. It will also be seen that the partitioning means provided for maintaining the plastic composition in such location may be made in the form of a very thin light weight, flexible and fully vulcanized film or skin of rubber composition which adds no appreciable thickness or stiffness to the crown region of the inner tube and accordingly affords much superior operating conditions in the completed inner tube than has been possible heretofore in earlier plastic type puncture sealing inner tubes where partitions of sheet rubber or the like were employed for separating the plastic composition thereof into individual compartments.

While I have shown and described a preferred method of practicing my invention, it will be readily apparent to those skilled in the art that various changes may be made therein without departing from the spirit of the invention or the scope of the appended claims.

Having thus described my invention, what I claim and desire to protect by Letters Patent is:

1. The method of forming a puncture sealing inner tube wall comprising the steps of coating with a film-forming solution one or more of the surfaces presented by a plurality of pieces of normally non-vulcanizable plastic rubber composition, assembling the pieces into a composite layer consisting of juxtaposed pieces of plastic composition separated by the coating material, placing upon a layer of vulcanized or vulcanizable rubber composition the composite layer so formed, placing a layer of vulcanizable rubber composition upon the exposed surface of the composite layer, and vulcanizing the assembled structure, whereby the coatings react with the normally non-vulcanizable rubber composition adjacent thereto and form thin vulcanized partitions attached to said layers of vulcanized rubber composition and extending between adjacent pieces of plastic material.

2. The method of forming full-molded puncture sealing inner tubes comprising the steps of coating with a film-forming solution one or more of the surfaces presented by a plurality of pieces of normally non-vulcanizable plastic rubber composition, assembling the pieces into a composite layer consisting of juxtaposed pieces of plastic composition separated by the coating material, inflating an annular tubular wall of vulcanized or vulcanizable rubber composition, placing upon the inflated wall the composite layer, placing a covering layer of vulcanizable rubber composition upon the exposed surface of the composite layer, and vulcanizing the assembled inner tube in a conventional inner tube mold of predetermined size, whereby reaction of the intermediate coatings with the normally non-vulcanizable rubber composition adjacent thereto during vulcanization produces relatively thin partitions of vulcanized rubber composition attached to said layers of vulcanized rubber composition and extending between adjacent pieces of plastic rubber composition.

3. The method of forming full-molded puncture sealing inner tubes comprising the steps of coating with a film-forming solution one or more of the surfaces presented by a plurality of pieces of normally non-vulcanizable plastic rubber composition, assembling the pieces into a composite layer consisting of juxtaposed pieces of plastic composition separated by the coating material, inflating an annular tubular wall of vulcanized or partially vulcanized rubber composition, buffing and cementing the crown region of the inflated wall, placing upon the crown region of the inflated wall the composite layer, placing a covering layer of vulcanizable rubber composition upon the exposed surface of the composite layer, pressing the lateral marginal edges of the covering layer into engagement with cemented portions of the tubular wall, and vulcanizing the assembled inner tube in a conventional inner tube mold of predetermined size, whereby relatively thin vulcanized membranes of rubber composition are produced attached to said layers of vulcanized rubber composition and extending between adjacent strips of plastic rubber composition by the reaction of the intermediate layers of film-forming solution with the normally non-vulcanizing plastic composition adjacent thereto.

4. The method of forming full-molded puncture sealing inner tubes comprising the steps of coating with a cure-producing solution one or more of the surfaces presented by a plurality of pieces of normally non-vulcanizable plastic rubber composition, assembling the pieces into a composite layer consisting of juxtaposed pieces of plastic composition separated by the coating material, inflating an annular tubular wall of vulcanized or partially vulcanized rubber composition, buffing and cementing portions of the crown region of the inflated wall, placing upon the crown region thus prepared the composite layer, placing a covering layer of vulcanizable rubber composition upon the outer surface of the composite layer, pressing the lateral marginal edges of the covering layer into engagement with cemented portions of the tubular wall, and vulcanizing the assembled inner tube in a conventional inner tube mold of predetermined size, whereby the reaction of the intermediate films with the normally non-vulcanizable rubber composition adjacent thereto during vulcanization produces relatively thin partitions of vulcanized rubber composition attached to said layers of vulcanized rubber composition and extending between adjacent strips of plastic rubber composition.

5. The method of forming full-molded puncture sealing inner tubes comprising the steps of coating with a cure-producing solution one or more of the surfaces presented by a plurality of pieces of normally non-vulcanizable plastic rubber composition, assembling the pieces into a composite layer consisting of juxtaposed pieces of plastic composition separated by the coating material, inflating an annular tubular wall of vulcanized or partially vulcanized rubber composition, buffing and cementing portions of the crown region of the inflated wall, placing upon the crown region of the inflated wall the composite layer, placing a covering layer of vulcanizable rubber composition upon the outer surface of the composite layer, pressing the lateral marginal portions of the covering layer into circumferential engagement with cemented portions of the tubular wall, and vulcanizing the assembled inner tube in a conventional inner tube mold of predetermined size, whereby the reaction of the intermediate films with the normally non-vulcanizable rubber composition adjacent thereto produces, during vulcanization, relatively thin membranes of vulcanized rubber composition bonded ot adjacent surfaces of the tubular wall and the covering layer and separating the plastic strips into individual closed compartments.

6. The method of forming a substantially continuous layer of plastic material restrained against flow in a direction parallel to its surface which consists in coating one or more of the surfaces presented by a plurality of pieces of plastic material with a solution of vulcanizable rubber composition in a solvent, assembling the pieces to form a continuous layer composed of pieces of plastic material separated by the coating material and vulcanizing in situ the dried deposit of the solution to form one or more skins of vulcanized rubber composition of negligible thickness disposed transverse to the surface of the layer.

7. The method of forming a substantially continuous layer of plastic material restrained against flow in a direction parallel to its surface which consists in coating one or more of the surfaces presented by a plurality of pieces of normally non-vulcanizable rubber composition with a cure producing solution, assembling the pieces in a continuous composite layer consisting of pieces of plastic rubber composition separated by the coating material and vulcanizing the layer whereby the coating material reacts with the normally non-vulcanizable rubber composition adjacent thereto to form one or more skins of vulcanized rubber composition disposed transverse to the surface of the layer.

8. The method of forming a substantially continuous layer of plastic material restrained against flow in a direction parallel to its surface which consists in coating one or more of the surfaces presented by a plurality of pieces of normally non-vulcanizable plastic rubber composition with a solution containing cure producing material and containing vulcanizable rubber composition in a solvent, assembling the pieces to form a composite layer consisting of juxtaposed pieces of plastic rubber composition separated by the coating material and vulcanizing in situ the dried deposit of said solution whereby the rubber contained in the coating is vulcanized and the material of the coating reacts with the normally non-vulcanizable rubber composition adjacent thereto to form one or more skins of vulcanized rubber composition disposed transverse to the surface of the layer.

ALFRED NICHOLAS IKNAYAN.